(12) United States Patent
Kodama

(10) Patent No.: US 6,808,167 B2
(45) Date of Patent: Oct. 26, 2004

(54) VIBRATION ISOLATING DEVICE

(75) Inventor: Yosei Kodama, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 346 days.

(21) Appl. No.: 10/019,990

(22) PCT Filed: Jun. 22, 2001

(86) PCT No.: PCT/JP01/05381

§ 371 (c)(1),
(2), (4) Date: Nov. 9, 2001

(87) PCT Pub. No.: WO01/90037

PCT Pub. Date: Nov. 29, 2001

(65) Prior Publication Data

US 2003/0071401 A1 Apr. 17, 2003

(51) Int. Cl.[7] ............................................... F16F 13/00
(52) U.S. Cl. .................................... 267/140.13; 267/220
(58) Field of Search ..................... 267/140.11, 140.13, 267/140.14, 219, 220; 248/562, 566, 636, 638

(56) References Cited

U.S. PATENT DOCUMENTS

| | | |
|---|---|---|
| 4,905,956 A | 3/1990 | Zemlicka et al. |
| 5,775,666 A | 7/1998 | Tsukamoto et al. |
| 6,250,615 B1 | 6/2001 | Leibach |
| 6,386,527 B2 * | 5/2002 | Oberle .................. 267/140.14 |
| 6,543,756 B2 * | 4/2003 | Ihara et al. ............ 267/140.13 |
| 6,585,242 B2 * | 7/2003 | Kodama et al. ....... 267/140.13 |

FOREIGN PATENT DOCUMENTS

| | | | |
|---|---|---|---|
| JP | 08-210423 | | 8/1996 |
| JP | 019144805 | * | 6/1997 |
| JP | 09-257087 | | 9/1997 |
| JP | 10-009330 | | 1/1998 |

* cited by examiner

Primary Examiner—Matthew C. Graham
(74) Attorney, Agent, or Firm—Jordan and Hamburg LLP

(57) ABSTRACT

A vibration isolator having a stopper function being able to prevent accumulation of water penetrating onto the top surface of a flange, and allowing the dies axially to be parted, includes a cylindrical body fitting connected to an upper side attachment fitting having a flange for the stopper via a vibration isolating substrate. A cylindrical stopper fitting extending outside the vibration isolating substrate up to above the flange is fixed to the body fitting, being folded inside so that the upper extremity portion of the stopper fitting lies above the flange. A stopper rubber is provided on the top surface and outer circumferential portion of the flange. The flange abuts the stopper fitting through the stopper rubber when the upper side attachment fitting moves substantially. A notch groove for drainage continuous from the top surface to the outer circumferential portion is provided at at least one place circumferentially on the stopper rubber.

9 Claims, 4 Drawing Sheets

VIBRATION ISOLATING DEVICE

FIELD OF THE INVENTION

This invention relates to a vibration-isolating device used to support a vibration generating source such as vehicle engine for the purpose of vibration isolation.

DESCRIPTION OF THE RELATED ART

A liquid-in vibration isolator has been known as a mount supporting a vibration generating source such as vehicle engine so as not to transmit its vibration to a vehicle body (for example, JP-A-9-89037, JP-A-10-9330).

The vibration isolator of such type is configured so that a cylindrical body fitting attached and fixed to the support side and an upper side attachment fitting attached to the side of the vibration generator such as engine are connected via a thick vibration isolating substrate made of a rubber material with external contour in the form of nearly truncated cone, a diaphragm is further disposed at the lower side of the body fitting opposite to the vibration isolating substrate, there are liquid-in chambers between the vibration isolating substrate and the diaphragm, the liquid-in chambers are divided into two liquid chambers on the side of the vibration isolating substrate and the diaphragm by means of a partition member, both liquid chambers are passed through by an orifice, the vibration damping and vibration isolating functions are fulfilled by the liquid flowing effect between both liquid chambers produced by the orifice and the vibration suppressing effect of the vibration isolating substrate.

The vibration isolator of this kind provides a stopper mechanism to restrain the displacement of more than the predetermined level of the upper side attachment fitting when the vibration isolating substrate is deformed due to vibration of engine and the like and the upper side attachment fitting moves in the up-and-down direction and the fore-and-aft direction square to the axial direction.

In the case of conventional apparatus, the stopper mechanism is constructed so that, with a flange for the stopper extending radially provided for the upper side attachment fitting, a cylindrical stopper fitting extending outside the vibration isolating substrate above the flange, the upper end of which is inwardly folded and formed so as to be located above the flange, is fixed to the cylindrical body fitting to act stopper function.

With the use of this stopper mechanism, in time of large displacement in the upward direction or square to the axial direction (fore-and-aft or lateral direction) accompanied by vibration, the flange for the stopper abuts the folded extremity or the side wall in the form of an inner flange at the upper extremity of the stopper fitting to restrain movement of the upper side attachment fitting more than a certain level, and the upper side attachment fitting is difficult to be released (falling off) when a vehicle comes into collision, etc. Thus, the stopper mechanism brings about high reliability in strength.

Incidentally, in the stopper mechanism, a relatively thick stopper rubber is provided on the top surface and outer circumferential portion of the flange abutting against the stopper fitting by the vulcanization adhering means for the purpose of shock absorption at the time of abutting. This stopper rubber is made up of a rubber integral to the vibration isolating substrate vulcanization-adhered to the upper side attachment fitting, and provided to circumferentially and continuously envelop the outer circumferential portion and the top surface of the flange. In particular, at the top surface side rubber portion of the stopper rubber, the stopper rubber is circumferentially and continuously in the form of convex against the top surface of the flange, its inner portion being in the form of concave. Besides, thickness of the stopper rubber becomes to some degree from the viewpoint of effect of shock absorption, etc. at the time of abutting.

Therefore, with the vibration isolator loaded in a vehicle, rainwater, etc. intruded from an opening at the top of the cylindrical stopper fitting gets in the inner concave through the stopper rubber at the top surface of the flange of the upper side attachment fitting, easily being accumulated without being discharged. Being accumulated, the water becomes rotten to easily cause corrosion or rust, and it is apprehended that the vibration isolating substrate or stopper rubber made of a rubber material may change in quality or be deteriorated.

There may be concave grooves formed on the top surface side rubber portion of the stopper rubber, radially at every required circumferential intervals. These concave grooves mainly serve to prevent abnormal sound caused at the time of adsorption at the stopper fitting, and its depth is not so deep, of the order of nearly half the thickness of the top surface side rubber portion, thus having not so much effect on discharging the intruded water.

Besides, the outer circumferential rubber portion of the stopper rubber extends radially from the top extremity of the vibration isolating substrate, increasing in diameter. That is, as against the outer circumferential rubber portion of the stopper rubber, the top extremity of the vibration isolating substrate below is in the shape of undercut. Therefore, since it is difficult to axially part the dies due to the undercut shape when the stopper rubber is formed simultaneously and integrally with the vibration isolating substrate, a split die must be used to form the outer circumference of the vibration isolating substrate.

SUMMARY OF THE INVENTION

The present invention provides a vibration isolator equipped with a stopper mechanism of the aforementioned configuration to have a stopper mechanism in the up-and-down direction and the fore-and-aft and lateral direction square to the axis, to be able to prevent water intruded into the top surface of a flange for the stopper from being accumulated, to be superior in durability, and to enable the dies to axially being parted even in the shape of undercut.

The vibration isolator of the present invention comprises a cylindrical body fitting, an upper side attachment fitting having the flange disposed at intervals upward an axis center of the body fitting and extended radially, a vibration isolating substrate made of a rubber material interposed between the body fitting and the upper side attachment fitting to connect both fittings, a cylindrical stopper fitting interconnected with the body fitting and extending outside the vibration isolating substrate up to above the flange, being folded inside so that the upper extremity portion lies above the flange, the top surface and outer circumferential portion of the flange provided with a stopper rubber, and is constructed so that the flange abuts the stopper fitting through the stopper rubber when the upper side attachment fitting moves largely in the upward direction or square to the axial direction accompanied by vibration, the stopper rubber having a notch groove for continuous drainage from the top surface to the outer circumferential portion at least one place circumferentially.

The vibration isolator serves the stopper function securely in time of large displacement in the upward direction or the fore-and-aft and lateral direction square to the axial direction under the condition loaded in a vehicle. Besides, if water such as rainwater intrudes from the top opening of the cylindrical stopper fitting and gets in the top surface of the flange of the upper side attachment fitting, the intruded water is drained through at least one notch groove for drainage formed on the stopper rubber provided around the top and outer circumferential portion of the flange without accumulating water on the top surface of the flange. Accordingly, corrosion or rust due to accumulation of water or change in quality, deterioration of vibration isolating substrate made of the rubber material or stopper rubber can be avoided, thus increasing the durability.

Furthermore, the stopper rubber is divided at least one place circumferentially by means of the notch groove. Therefore, since the stopper rubber is easy to be deformed as compared with circumferentially annular and continuous one, it is possible to part the dies axially even if an outside diameter of the stopper rubber is larger than the upper extremity of the vibration isolating substrate below the stopper rubber.

It is desirable that the notch groove for drainage has a depth substantially equal to or a little shallower than the thickness of the stopper rubber from the top surface to the outer circumferential surface, thus securely carrying out drainage action on the top surface of the flange.

It is also advisable to form the notch groove at one or a few places circumferentially. By doing so, the notch groove of the aforementioned depth being formed can adequately carry out the stopper function preventing elastic force of the stopper rubber from being excessively smaller. In particular, when the notch grooves are provided at two opposite places circumferentially, drainage action on the top surface of the flange can be carried out properly and securely, without excessively reducing the elastic force of the stopper rubber.

When one of the notch groove for drainage is located at the lowest level on the top surface of the flange while being loaded on a vehicle with a gradient, the intruded water will be drained further favorably.

As for the vibration isolator, it is desirable that the vibration isolating substrate is of nearly truncated cone, the upper extremity of the vibration isolating substrate is stuck to the lower surface of the flange of the upper side attachment fitting by means of the vulcanization adhering means, and that the stopper rubber is formed by the rubber material continuously from the upper extremity of the vibration isolating substrate. Accordingly, the stopper rubber can be formed simultaneously by the rubber material integral with the vibration isolating substrate, requiring no extra forming process, thus capable of producing it at lower cost.

In case where the outer circumferential rubber portion of the stopper rubber formed integral with the vibration isolating substrate as described above has larger diameter than the upper extremity of the vibration isolating substrate, it is desirable that the notch groove for drainage is formed nearly flush with the upper extremity of the vibration isolating substrate at the outer circumferential rubber portion of the stopper rubber.

Therefore, since the stopper rubber is divided at least one place circumferentially irrespective of the shape of the undercut at the upper extremity of the vibration isolating substrate below the outer rubber portion of the stopper rubber, the stopper rubber is easy to be deformed and the dies can easily be parted axially during the forming process.

Besides, as for the vibration isolator, it is desirable that the vibration isolating substrate is of nearly truncated cone, the lower extremity of the vibration isolating substrate is stuck to the upper portion of the cylindrical body fitting, and that a draining means is provided from the lower portion of the outside space of the vibration isolating substrate through outside of the vibration isolator. In particular, when an annular concave portion is formed between the outer circumferential lower portion of the vibration isolating substrate and the upper extremity inner circumferential surface of the body fitting, it is advisable to form a through-hole from the lower portion of the concave through the body fitting and the stopper fitting to the outside as a draining means. Consequently, since water falling from the upper surface of the flange through the notch groove for drainage can be drained through the draining means, for example, such as through-hole, to the outside of the vibration isolator, water is not accumulated in the space such as concave outside the vibration isolating substrate.

With regard to the vibration isolator, it is desirable, from the viewpoint of vibration damping function and vibration isolating function, that a diaphragm made of a rubber film is disposed opposite to the vibration isolating substrate at the lower side of the body fitting, that there is a liquid-in chamber between the vibration isolating substrate and the diaphragm, that the liquid-in chamber is divided into two liquid chambers at the vibration isolating substrate and the diaphragm by means of a partition member, and that both liquid chambers are connected by an orifice.

BEST MODE FOR CARRYING OUT THE INVENTION

Figure 1:
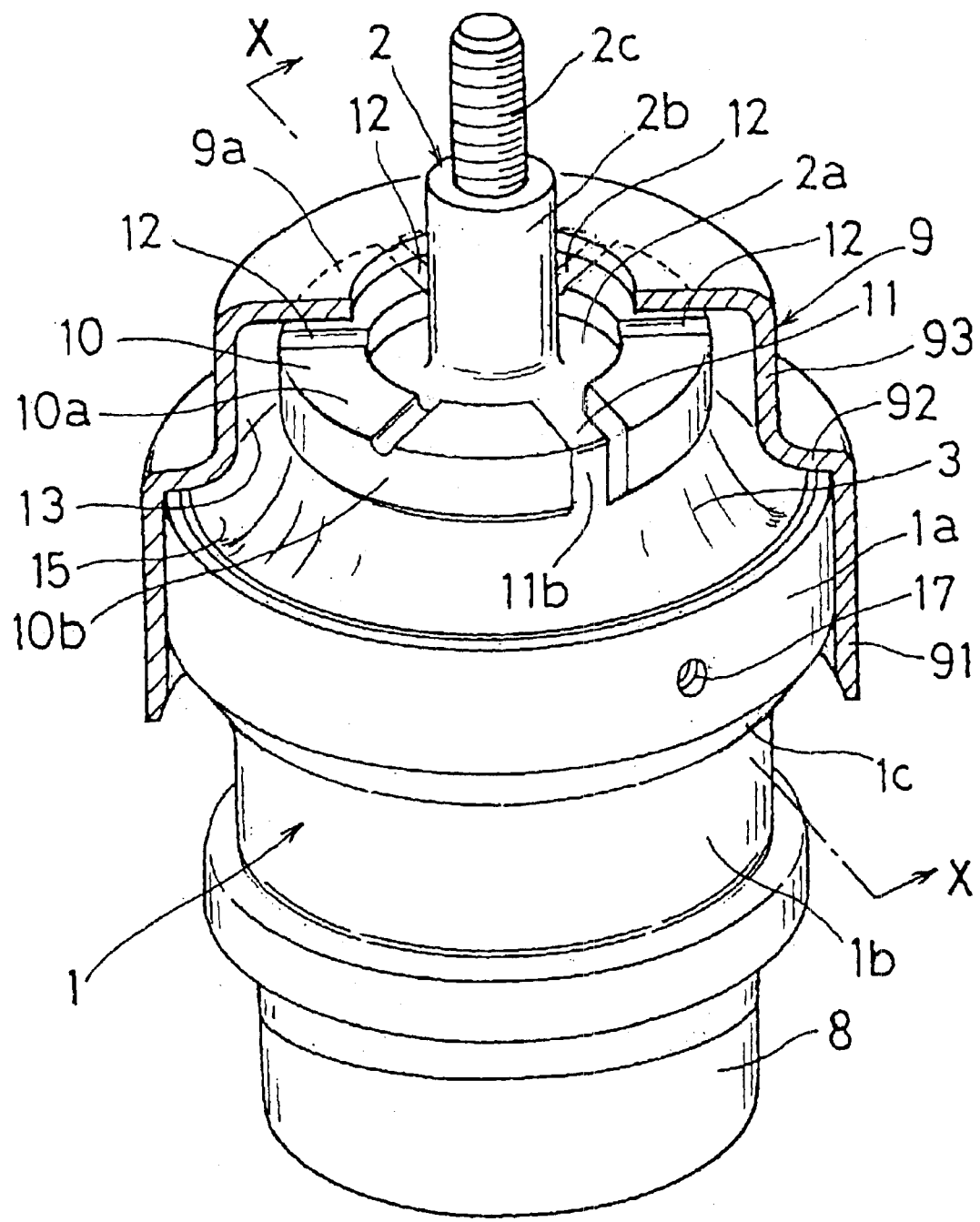
FIG. 1 is a partial cutaway perspective view of stopper fitting showing one example of vibration isolator of the present invention.

The embodiments of the present invention will be described with reference to the accompanying drawings, but the invention is not limited thereto.

In the drawings, the reference numeral 1 indicates a cylindrical body fitting of bottom open type of near cup shape having an opening 1a at the bottom, and the numeral 2 indicates an upper side attachment fitting disposed at a given intervals at the upper portion of the axis center of the body fitting 1. At the lower portion of the upper side attachment fitting 2, for example, at the lower extremity the flange 2a for the stopper extending radially outwardly is formed in one piece, and a mounting bolt 2c is projectively fitted at the upper portion 2b by means of press-fitting or welding means, so as to be able to fix a member 20 such as mounting bracket at the side of the vibration generator.

The numeral 3 indicates a vibration isolating substrate made of a rubber material with external contour in the form of nearly truncated cone, and an upper extremity 3a of the vibration isolating substrate 3 is stuck to the lower surface of the flange 2a of the upper side attachment fitting 2 by means of vulcanization adhering means. There is a case where a part of the upper side attachment fitting 2, for example, a portion (not shown) protruding downwardly from the flange 2a is embedded in the vibration isolating substrate 3. The outer circumference at the lower extremity of the vibration isolating substrate 3 is stuck to the inner circumference at the upper portion of the body fitting 1 by means of the vulcanization adhering means. As illustrated, the upper extremity 1a of the body fitting 1 is upset formed through the inclined portion 1c from the lower portion 1b, and the outer circumference at the lower portion of the vibration isolating substrate 3 is vulcanization adhered to the inclined portion 1c. A rubber layer 3b integral with the vibration isolating substrate 3 is provided at the inner circumference of the upper extremity 1a. Thus, the body fitting 1 is connected to the upper side attachment fitting 2 via the vibration isolating substrate 3.

Furthermore, a diaphragm 4 made of the rubber film opposite to the vibration isolating substrate 3 is disposed at the side of the lower opening of the body fitting 1, and inner chambers between the diaphragm 4 and the vibration isolating substrate 3 are formed as liquid-in chambers 5. At the inner circumference of the body fitting 1, a partition member 7 is fitted liquid-tightly, and the liquid-in chamber 5 is divided into a liquid chamber 5a on the side of the vibration isolating substrate 3 and a liquid chamber 5b on the side of the diaphragm 4 by means of the partition member 7. Both liquid chambers 5a and 5b are connected through an orifice resided in the partition member 7, and the vibration damping and vibration isolating functions are performed by means of the liquid flowing effect between both liquid chambers 5a and 5b and the vibration suppressing effect of the vibration isolating substrate 3.

The outer circumferential extremities of the diaphragm 4 and the partition member 7 are fixed integrally at the lower extremity of the cylindrical body fitting 1, together with the outer circumferential edge of the diaphragm 4 and a bottom member 8 in the form of a cylinder with a bottom covering the lower portion thereof, by means of caulking tightening means.

The stopper rubber 10 is attached to from the outer circumferential edge up to the outer circumferential surface on the top surface of the flange 2a of the upper side attachment fitting 2 by means of the vulcanization adhering means, and abuts elastically against the stopper fitting described later. The reference numeral 10a indicates a top surface rubber portion of the stopper rubber, and the numeral 10b indicates an outer circumferential rubber portion.

The stopper rubber 10 is vulcanization formed integrally with the vibration isolating substrate 3 by the rubber material continuously from the upper extremity of the vibration isolating substrate 3 stuck to the bottom surface of the flange 2a. The outer circumferential rubber portion 10b is formed larger than the top extremity of the vibration isolating substrate 3 in diameter. Thus, the top extremity 3a of the vibration isolating substrate 3 is constricted as against the outer circumferential rubber portion lob, in other words, forming the shape of undercut.

Figure 2:
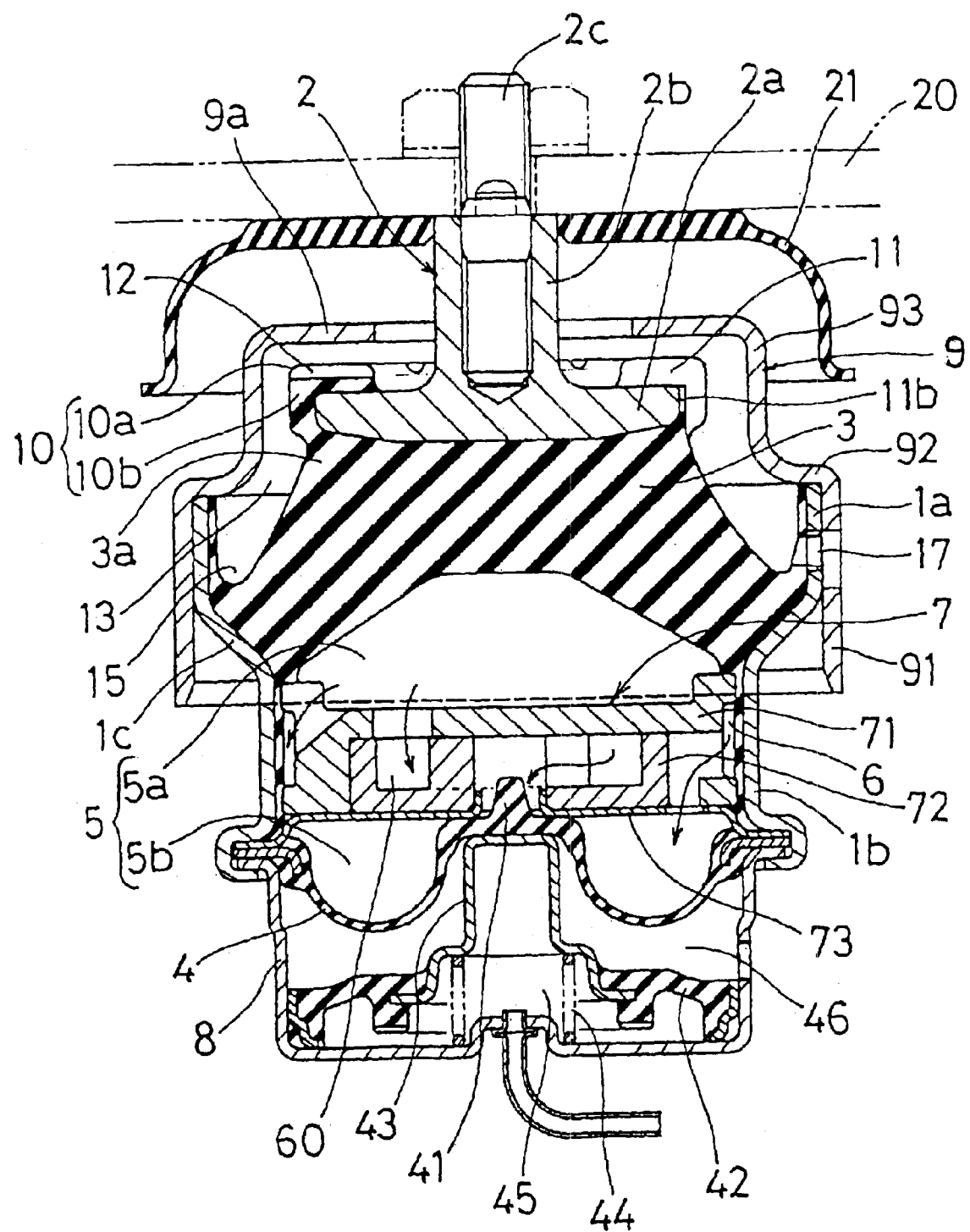
FIG. 2 is a longitudinal sectional view taken along the line X—X in FIG. 1.
Figure 3:
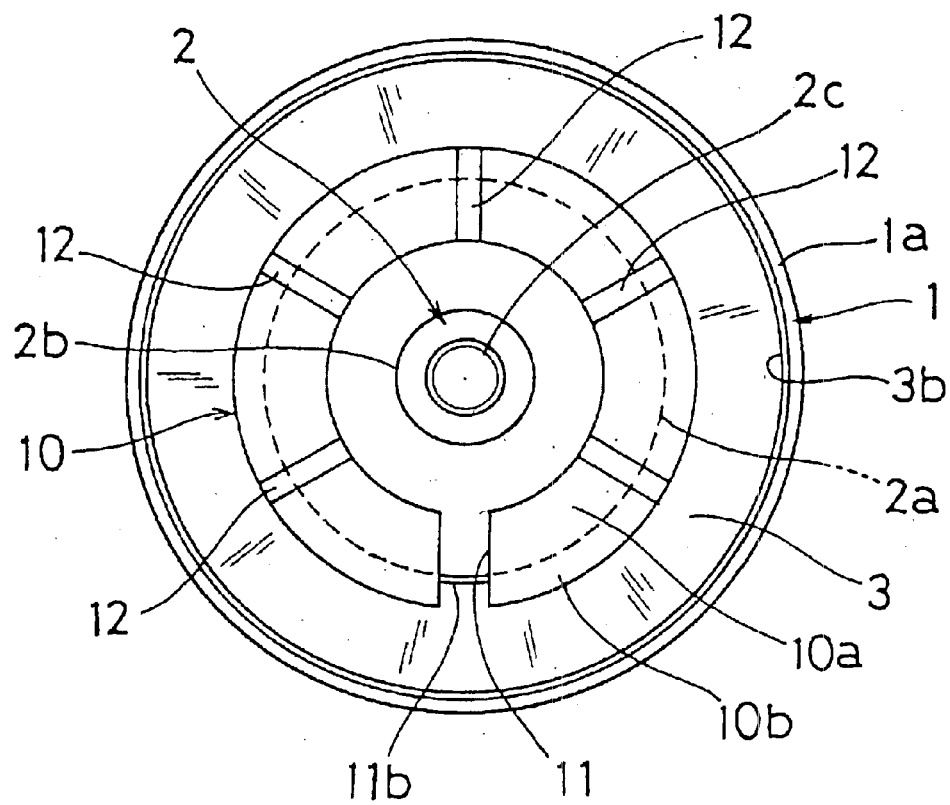
FIG. 3 is a plan view with the stopper fitting omitted.
Figure 4:
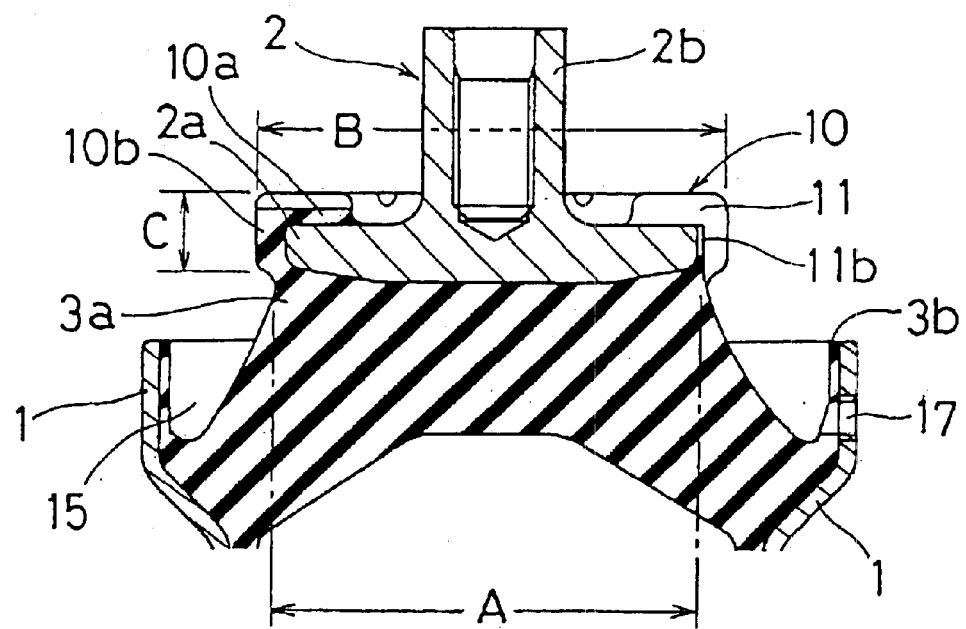
FIG. 4 is a partial sectional view of FIG. 3.
Figure 6:
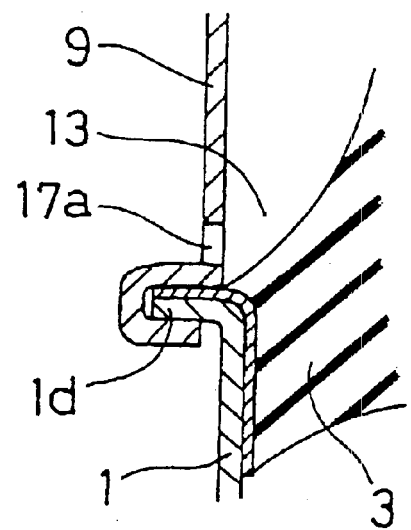
FIG. 6 is a partial sectional view showing other example of vibration isolator of the present invention.

Moreover, nearly cylindrical stopper fitting 9 extending from the flange 2a to the upward position outwardly of the vibration isolating substrate 3 is fixed to the body fitting 1. As shown in FIG. 2, the lower portion 91 of the stopper fitting 9 is formed via a step portion 92 larger than the upper portion 93 in diameter, and the lower portion 91 of larger diameter is press-fitted and secured up to the position to abut the step 92 against the upper extremity 1a of the body fitting 1. Besides, as shown in FIG. 6, the lower extremity of the stopper fitting 9 can also be fixed to an opening extremity 1d of the body fitting 1 in the form of a flange by means of the caulking tightening means.

The stopper fitting 9, the upper extremity of which is folded inside as stopper portion to be in the form of inner flange, is interposed between the flange 2a of the upper side attachment fitting 2 and, the member 20 at the side of the vibration generator to be fixed upward thereof, especially, to the upper side attachment fitting 2. The reference numeral 21 is a rubber cover attached to the upper extremity of the upper side attachment fitting 2 to prevent dust and rainwater, etc. from intruding through the upper opening of the stopper fitting 9 and also to play the role of shock absorption when the stopper fitting 9 abuts the member 20.

Accordingly, when the upper side attachment fitting 2 moves upward largely accompanied by vibration, the flange 2a abuts via the stopper rubber 10 against the folded extremity 9a in the form of an inner flange at the upper extremity of the stopper fitting 9, whereas, at the time of downward large displacement, the member 20 abuts through the rubber cover 21 against the folded extremity 9a, thus playing the role of stopper function. Besides, at the time of large displacement in the direction square to the axial direction (fore-and-aft, lateral), the outer circumference of the flange 2a abuts through the stopper rubber 10 against the side wall portion at the upper extremity of the stopper fitting 9, placing the role of stopper action.

In the stopper mechanism, continuous notch groove 11 for drainage, extending from the top surface side rubber portion 10a of the stopper rubber 10 to the outer circumferential rubber portion 10b, is provided at least one place circumferentially on the stopper rubber 10 fitted to the flange 2a of the upper side attachment fitting 2, for example at two opposite places as shown, so as to be able to drain water such as rainwater, etc., which is intruded into the top surface of the flange 2a.

The notch groove 11 has nearly the same depth as the thickness of the stopper rubber 10, or slightly shallower depth than the aforementioned rubber thickness, desirably two thirds or more of the aforementioned rubber thickness. That is, when a rubber layer of the thickness of more than one third of the aforementioned rubber thickness is left at the notch groove 10 on the top surface of the flange 2a, difference from the top surface of the flange grows larger, so as to reduce the aforementioned effect of water drainage. Therefore, it is desirable to form the notch groove 11 so that the top surface rubber portion 10a has little or no rubber layer left above the top surface of the flange 2a.

At the outer circumferential rubber portion lob, although the depth of the notch groove 11 can be set so that the notch groove 11 leaves one third or less of aforementioned rubber thickness, for example, the rubber layer 11b of the order of 1 mm in thickness, it is desirable in the embodiment to form the bottom surface of the notch groove 11 nearly flush with the outer circumferential surface of the upper extremity 3a of the vibration isolating substrate 3.

Figure 5:
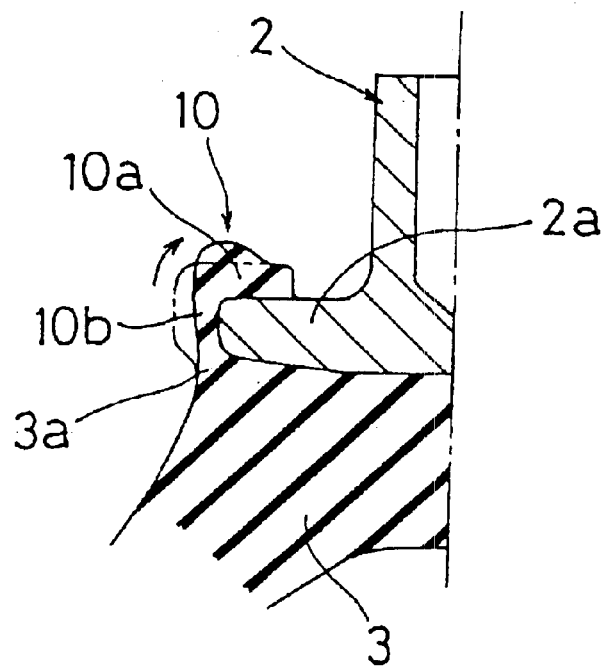
FIG. 5 is a schematic sectional view showing the deformed stopper rubber when parting the dies after vulcanization forming of the vibration isolating substrate.

Provided that the notch groove 11 is formed as described above, the outer circumferential rubber portion 10b of the stopper rubber 10 will be divided circumferentially by at least one notch groove 11. Therefore, since the outer circumferential rubber portion 10b is liable to be deformed as compared with circumferentially annular continuous portion, even if the upper extremity 3a of the vibration isolating substrate 3 takes the shape of undercut against the outer circumferential rubber portion 10b as described above, it can be deformed, for example, as shown in FIG. 5. Thus, after being formed together with the vibration isolating substrate 3, it is possible to draw out the dies axially. That is, it is not necessary to use a split die to form the outer circumferential surface of the vibration isolating substrate 3 and the stopper rubber 10, thus easier to be formed.

The notch groove 11 for drainage can be formed at one place or two or more places at intervals circumferentially. The more the number of the notch groove 11, the smaller the circumferential size of the stopper rubber 10, reducing the elastic force as stopper rubber 10. Therefore, depending on the groove width, the number of notch grooves 11 is desirably up to about four at equal spaces circumferentially, more desirably from one to three places, for example, two places opposite to each other as illustrated.

The reference numeral 12 indicates a relatively shallow concave groove of about half or less rubber thickness provided at two or more places circumferentially at every required space on the top surface rubber portion 10a, mainly for the purpose of prevention of abnormal noise due to adsorption at the stopper fitting. The notch groove 11 can be formed at any place of the concave groove 12.

In any case, it is well devised that one of the notch grooves 11 for drainage is disposed at the lowest level on the top surface of the flange 2a when the vibration isolator of the invention is placed on-board the vehicle with a gradient, whereby the intruded water will be drained more properly.

Functionality (spring constant in the direction square to the axis, etc.) as the vibration isolator is determined by an outside diameter A of the upper extremity that is constricted on the vibration isolating substrate 3, and the durability of the stopper rubber 10 is determined by axial dimension B and an outside diameter C of the stopper rubber portion. Accordingly, the dimension is set so as to meet such performance.

Since the lower extremity of the vibration isolating substrate 3 is stuck to the body fitting 1 and the stopper fitting 9 is provided outwardly thereof, space 13 is left between the vibration isolating substrate 3 and the stopper fitting 9 outside of the vibration isolating substrate 3. Therefore, water drained from the top surface of the flange 2a through the notch groove 11 gets into the space 13. Accordingly, draining means is provided at the lower level in the aforementioned space 13 leading to the outside of the apparatus.

That is, as shown in the embodiments, since an annular concave 15 is formed below the space 13 between the outer circumferential surface lower portion of the vibration isolating substrate 13 and the upper extremity inner circumferential surface of the body fitting 1 when the lower extremity of the vibration isolating substrate 3 is stuck to the inclined portion 1b of the body fitting 1, a through-hole 17 is pierced at the lower level portion of the concave portion 15 through the body fitting 1 and the stopper fitting 9 to the outside as a draining means, so as to drain water coming into the concave portion 15 to the outside of the apparatus.

As shown in FIG. 6, when the lower extremity of the vibration isolating substrate 3 is vulcanization adhered to the upper extremity of the body fitting 1 and the outer circumferential surface of the vibration isolating substrate 3 is inclined continuously to the top surface of the opening extremity 1d in the form of a flange of the body fitting 1, a notch hole 17a may be drilled at a portion of the stopper fitting 9 corresponding to the lower level portion of the aforementioned space 13 as the draining means.

The through-hole 17 and notch-hole 17a are not limited to a single place only, and can be provided at more than one place. It is also desirable to dispose one of such holes at the lowest position when placing on-board the vehicle for drainage effect.

In the embodiment illustrated, a partition member 7 dividing a liquid-in chamber 5 into two liquid chambers 5a, 5b, comprises two inside/outside members 71, 72, as inside structure of the vibration isolator, made up of formed member of metal materials such as aluminum, and rigid materials such as synthetic resin, and a support plate member 73 disposed at the underside. An outer edge of the support plate member 73 is caulked and secured to the lower extremity of the cylindrical body fitting 1. There are two orifices provided on the partition member 7 to connect the aforementioned both liquid-in chambers 5a, 5b: an outside orifice 6 with large liquid flowing resistance extending circumferentially at the outer circumference, and an inside orifice 60 with small liquid flowing resistance disposed radially inside of the outside orifice 6.

The inside orifice 60 is provided so as to be opened and closed by a valve body 41 formed integrally at the center of the diaphragm 4. As a means thereof, a forcing auxiliary member 43, supported by an annular rubber film portion 42 that allows axial displacement, is disposed between the diaphragm 4 and the bottom of the bottom member 8, a spring 44 forcing the valve body 41 via the forcing auxiliary member 43 toward the partition member 7 is disposed, the valve body 41 is provided to block up an opening 61 on the side of the liquid chamber 5b of the inside orifice 60 by being pressed by the force of the spring 44. By introducing negative pressure into a changeover chamber 4 capable of selectively introducing atmospheric pressure and negative pressure between the forcing auxiliary member 43 and the second attachment fitting, the diaphragm 4 is released from the partition member 7 against the energizing force of the spring 44 to throw open the inside orifice 60, thus configuring changeover control type liquid-in vibration isolator. The reference numeral 46 indicates an air chamber interconnecting to the atmosphere.

Other than the changeover control type liquid-in vibration isolator described above, the vibration isolator of the present invention may have another embodiment of simple two-chamber type liquid-in vibration isolator, in which two liquid chambers are interconnected by a single orifice, with the adoption of aforementioned similar stopper mechanism configuration.

With regard to the embodiment of the vibration isolator described above, for example, before usage, the body fitting 1 is fixed on the side of the support members such as vehicle body frame, and the upper side attachment fitting 2 is attached and secured to the member 20 on the side of the vibration generator such as engine. In particular, on being placed on-board with a gradient, the vibration isolator should be used, so that the notch groove 11 formed on the stopper rubber 10 of the flange 2a for the stopper lies at the lowest level.

As for the use of the vibration isolator, when the upper side attachment fitting 2 moves largely upward and downward accompanied by the vibration of the vibration isolator, the flange 2a for the stopper of the upper side attachment fitting 2 or the member 20 on the side of the vibration generator abuts elastically, against the folded extremity 91 of the stopper fitting 9, via the stopper rubber 10 or the rubber cover 21, thus playing the role of stopper action without giving a large shock. Besides, at the time of large displacement in the direction square to the axial direction (fore-and-aft, lateral) against the upper side attachment fitting 2, the outer circumferential portion of the flange 2a abuts elastically through the outer circumferential rubber portion 10b of the stopper rubber 10, playing the role of proper stopper action.

On the other hand, when water such as rainwater, intrudes from an opening at the top of the cylindrical stopper fitting 9 and gets in the top surface of the flange 2a of the upper side attachment fitting 2, the intruded water will be drained through the notch groove 11 for drainage formed on the stopper rubber 10 fitted to the top surface portion and the outer circumferential portion of the flange 2a, thus accumulating no water on the top surface of the flange 2a. Accordingly, corrosion or rust due to accumulation of water, or change in quality or deterioration of the vibration isolating substrate made of a rubber material or the stopper rubber, can be avoided, thus capable of increasing the durability thereof.

INDUSTRIAL APPLICABILITY

The vibration isolator of the present invention provides the stopper function in the up-and-down direction and the fore-and-aft and lateral direction square to the axis, also being able to prevent water on the top surface of the flange from being accumulated, thus putting to use properly to support vibration generator such as vehicle engine for the purpose of vibration isolation.

What is claimed is:

1. A vibration isolator comprising:
   a.) a cylindrical body fitting;
   b.) an upper side attachment fitting having a flange at intervals upward of an axial center of said body fitting and extending radially outward therefrom;
   c.) a vibration isolating substrate of a rubber material interposed between said body fitting and said upper side attachment fitting to connect both fittings; and
   d.) a cylindrical stopper fitting interconnected with said body fitting and extending outside said vibration isolating substrate up to above said flanges,
   said cylindrical stopper fitting being folded inside so that an upper extremity portion thereof lies above said flange,
   a top surface and outer circumference of said flange being provided with a stopper rubber, and
   said cylindrical stopper fitting being constructed so that said flange abuts said stopper fitting through said stopper rubber when said upper side attachment fitting moves in at least one direction of an upward direction and at a right angle to an axial direction due to vibration;
   wherein said stopper rubber attached to said flange portion has at least one circumferentially positioned continuous notch groove for drainage, extending from said top surface to said outer circumference.

2. The vibration isolator according to claim 1, wherein said notch groove for drainage has a depth substantially equal to or shallower than a thickness of said stopper rubber from said top surface to said outer circumferential surface.

3. The vibration isolator according to claim 1 or claim 2, wherein two notch grooves for drainage are provided circumferentially opposite to each other.

4. The vibration isolator according to claim 1 or claim 2, wherein one of said notch grooves for drainage is located at a lowest level while being located on a vehicle.

5. The vibration isolator according to claim 1 or claim 2, wherein said vibration isolating substrate has a frusto-conical shape, an upper extremity of said vibration isolating substrate is attached to a lower surface of said flange of said upper side attachment fitting by a vulcanization adherent, and that said stopper rubber is formed by rubber material continuous from said upper extremity of said vibration isolating substrate.

6. The vibration isolator according to claim 5, wherein a diameter of said outer circumferential rubber portion of said stopper rubber has is larger than said upper extremity of said vibration isolating substrate, and said notch groove for drainage is formed substantially flush with said upper extremity of said vibration isolating substrate.

7. The vibration isolator according to claim 1 or claim 2, wherein said vibration isolating substrate has a frusto-conical shape, an upper extremity of said vibration isolating substrate is attached to an upper portion of said cylindrical body fitting, and a drain is provided from a lower portion of an outside space of said vibration isolating substrate through an outside of said vibration isolator.

8. The vibration isolator according to claim 7, wherein an annular concave portion is formed between said outer circumferential lower portion of said vibration isolating substrate and an upper extremity inner circumferential surface of said body fitting, and a through-hole connects a lower portion of said concave portion to an outside through said body fitting and said stopper fitting.

9. The vibration isolator according to claim 1 or claim 2, wherein a rubber film diaphragm is opposite to said vibration isolating substrate at a lower side of said body fitting, an inner chamber between said vibration isolating substrate and said diaphragm is liquid inlet chamber, said liquid inlet chamber is divided into two liquid chambers on a side of said vibration isolating substrate and said diaphragm by a partition member, with both liquid chambers being connected to one another by an orifice.

* * * * *